Dec. 27, 1949 R. H. GODDARD 2,492,570
ROTATING COMBUSTION CHAMBER
Filed July 26, 1946

INVENTOR.
Robert H. Goddard, Dec'd.
Esther C. Goddard, Executrix
BY
Chas. T. Hawley
ATTY Patented Dec. 27, 1949

2,492,570

UNITED STATES PATENT OFFICE 2,492,570

ROTATING COMBUSTION CHAMBER

Robert H. Goddard, deceased, late of Annapolis, Md., by Esther C. Goddard, executrix, Paxton, Mass., assignor of one-half to The Daniel and Florence Guggenheim Foundation, New York, N. Y., a corporation of New York Application July 26, 1946, Serial No. 686,386

15 Claims. (Cl. 60—35.6)

This invention relates to a rotating combustion chamber designed for use in propulsion apparatus such as rocket craft and having an open discharge nozzle at one side of the combustion chamber.

It is the general object of the invention to provide a rotating combustion chamber of this general type in which improved provision is made for complete and effective mixing of the combustion liquids before ignition.

A further object is to provide a rotating combustion chamber in which provision is made for efficient cooling of all parts of the apparatus.

The invention further relates to arrangements and combinations of parts which will be hereinafter described and more particularly pointed out in the appended claims.

Preferred forms of the invention are shown in the drawing, in which

Figure 1:
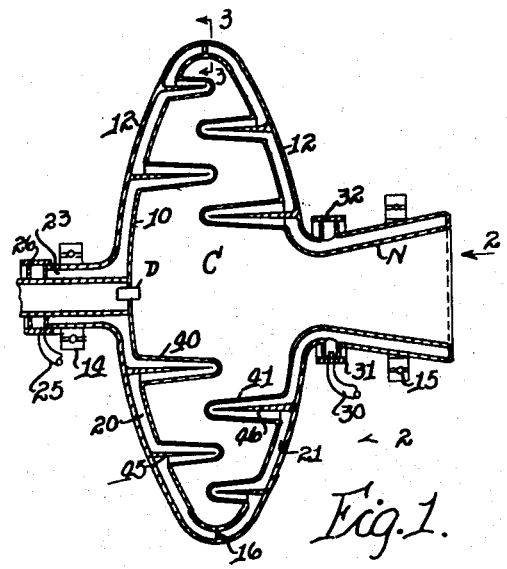
Fig. 1 is a sectional front elevation of a combustion chamber embodying this invention.

Referring to Figs. 1 to 4, the improved combustion chamber C comprises a casing 10 having the general cross section of a relatively flat oblate spheroid and having a discharge nozzle N associated therewith.

The combustion chamber and nozzle are supported in spaced relation with respect to a jacket casing 12, which in turn is rotatably mounted in suitable bearings 14 and 15. An annular partition 16 separates the jacket space into two parts 20 and 21. The jacket space 20 communicates with an annular space 23 to which liquid fuel, as gasoline, may be fed through a nozzle 25 extending through a non-rotating sealing ring 26. The jacket space 21 similarly receives a liquid oxidizing agent, as liquid oxygen, through a nozzle 30 mounted to extend through a non-rotatable sealing ring 31 covering an annular inlet port 32.

The liquids after entering the jacket spaces 20 and 21 are carried outward by centrifugal force and are injected as sprays through two annular series of slots 35 and 36 (Fig. 4) at the periphery of the chamber C and at each side of the annular partition 16. The sprays of the two liquids impinge at substantially 90°, so that the resultant velocity is relatively low. Hollow spiral semi-partitions 40 and 41 are formed on the inner faces of the chamber casing 10 and each extends slightly beyond the middle section thereof. The two semi-partitions 40 and 41 start at opposite points adjacent the periphery of the chamber C and have the general relationship to each other of double-pitch screw-threads. Consequently the intermingled sprays of combustion elements are forced to travel inward toward the axis of the chamber along a tortuous path, alternately directed to the right and then to the left as viewed in Fig. 1 as the gases approach the axis of the chamber.

The rate of travel of the intermingled and partially vaporized liquids is relatively slow, due to the low initial velocity and to the tortuous path of travel and also to the fact that the inward movement is opposed by centrifugal force.

Figure 2:
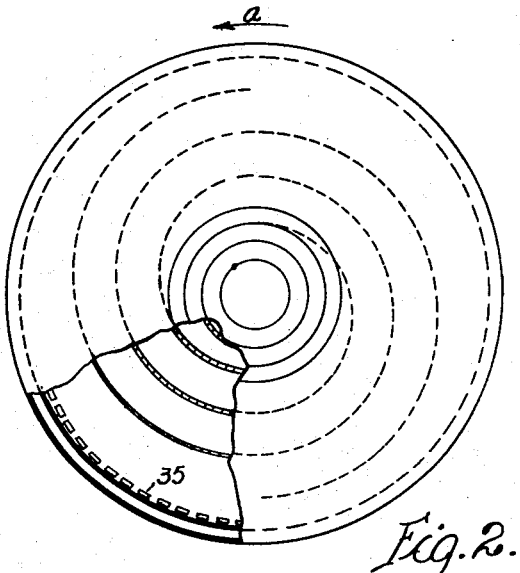
Fig. 2 is a side view thereof, partly in section and looking in the direction of the arrow 2 in Fig. 1.
Figure 4:
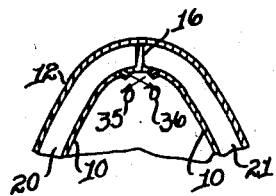
Fig. 4 is a partial transverse sectional view, taken along the line 4—4 in Fig. 3.
Figure 3:
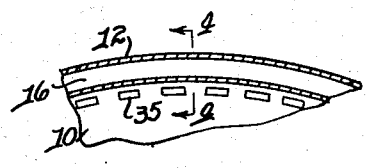
Fig. 3 is an enlarged partial sectional side view, taken along the line 3—3 in Fig. 1.

It will be understood that the combustion chamber is positively rotated, preferably in the direction indicated by the arrow $a$ in Fig. 2, which direction of rotation also tends to slow down the inward travel and to thus prolong the time for thorough vaporizing and mixing of the combustion elements.

Any convenient mechanism may be provided to rotate the combustion chamber, one such mechanism being shown in the prior Goddard Patent No. 2,424,610, issued July 29, 1947.

Any suitable ignition device D may be provided to start combustion. Combustion takes place largely in the axial or central portion of the chamber C, and the expanding gases are discharged through the nozzle N with the usual propulsive effects.

Preferably, spiral partitions 45 and 46 extend inward from the opposite sides of the jacket casing 12 and thus force the combustion liquids to flow to the inner ends of the spiral partitions 40 and 41 in their passage to the spray openings 35 and 36.

Also, the combustion liquid supplied through the feed nozzle 30 backs up into the jacket space around the nozzle N with desired cooling effect.

Figure 5:
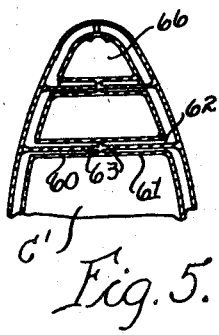
Fig. 5 is a view similar to Fig. 4 but showing a modified construction.

A somewhat more rigid construction is shown in Fig. 5, in which the hollow spirals 60 and 61 are aligned and joined together at their inner ends, and in which the interposed partitions 62 extend to the ends of the hollow partitions 60 and 61, but are provided with openings 63 through which the combustion liquids may pass.

With this modified construction, the combustion chamber C' comprises a single inwardlyspiraling mixing passage 66 which, however, does not increase substantially in its axial dimension toward the center, due to the flattened contour of the combustion chamber. Consequently, the successive turns of the spiral partitions may be at substantially uniform spacing without making the inward component of the flow velocity too small.

Figure 6:
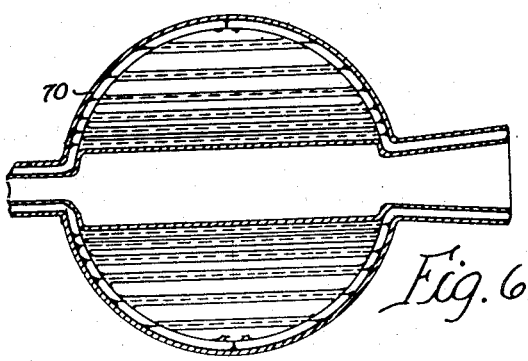
Fig. 6 is a view similar to Fig. 1 but showing a further modification.

If the chamber is of spherical cross section, as indicated at 70 in Fig. 6, it will be advisable to progressively decrease the spacing between the turns of the spiral partition to compensate for the increase in axial length of the mixing space.

The construction shown in Fig. 5 is preferred, as being simpler and more efficient. With all forms of the invention, however, very thorough mixing of the combustion elements takes place and very complete combustion is achieved.

Having thus described the invention and the advantages thereof, it will be understood that the invention is not to be limited to the details herein disclosed, otherwise than as set forth in the claims, but that what is claimed is:

1. A rotating combustion chamber comprising a casing having an axially disposed combustion locus and an axial discharge nozzle, means to feed sprays of combustion liquids to said chamber at the periphery thereof, and means to guide the intermingled combustion liquids and the vapors thereof along an elongated and substantially spiral path toward said axially disposed combustion locus.

2. A rotating combustion chamber comprising a casing having an axially disposed combustion locus and an axial discharge nozzle, means to feed sprays of combustion liquids to said chamber at the periphery thereof, and spiral partitions in said chamber by and between which the intermingled combustion liquids and the vapors thereof are caused to flow toward said axially disposed combustion locus.

3. The combination in a rotating combustion chamber as set forth in claim 2, in which the combustion chamber is of spherical shape and in which the spiral partitions are decreasingly spaced apart toward the axis of said chamber.

4. A rotating combustion chamber comprising a casing having an axial discharge nozzle, means to feed sprays of combustion liquids to said chamber at the periphery thereof, and spiral partitions in said chamber by and between which the intermingled combustion liquids and the vapors thereof are caused to flow toward the axis of said chamber, said partitions each extending half way across said chamber.

5. The combination in a rotating combustion chamber as set forth in claim 4, in which the chamber is an oblate spheroid in cross section.

6. The combination in a rotating combustion chamber as set forth in claim 4, in which the chamber is an oblate spheroid in cross section, and in which adjacent turns of the spiral partitions are substantially uniformly spaced apart radially.

7. The combination in a rotating combustion chamber as set forth in claim 4, in which the half-partitions from opposite sides of said chamber are aligned and abut and are secured to each other at the middle section of said chamber.

8. A rotating combustion chamber comprising a casing having an axial discharge nozzle, means to feed sprays of combustion liquids to said chamber at the periphery thereof, a spiral half-partition extending inward from one inner face of said casing, and a second spiral half-partition extending inward from the opposite inner face of said casing, the spirals of said two partitions starting inward from opposite points on a diameter of said casing.

9. A rotating combustion chamber comprising a casing having an axial discharge nozzle, means to feed sprays of combustion liquids to said chamber at the periphery thereof, and spiral partitions in said chamber by and between which the intermingled combustion liquids and the vapors thereof are caused to flow toward the axis of said chamber, the partitions extending inward from opposite sides of said casing being out of axial alignment with each other and providing tortuous paths of liquid and vapor travel.

10. A rotating combustion chamber comprising a casing having an axial discharge nozzle, means to feed sprays of combustion liquids to said chamber at the periphery thereof, a spiral half-partition extending inward from one inner face of said casing, and a second spiral half-partition extending inward from the opposite inner face of said casing.

11. A rotating combustion chamber comprising a casing having an axial discharge nozzle, hollow spiral half-partitions extending inward from the opposed inner side faces of said casing, a jacket providing a jacket space enclosing said chamber casing and said nozzle and divided by an annular partition at the periphery of said chamber, axial means to feed combustion liquids to said separate jacket spaces, and means to spray said liquids into said combustion chamber from said jacket spaces.

12. The combination in a rotating combustion chamber as set forth in claim 11, in which spiral flanges mounted on the inner side of said jacket extend into said spiral hollow partitions but are spaced therefrom.

13. The combination in a rotating combustion chamber as set forth in claim 11, in which spiral flanges mounted on the inner side of said jacket extend into said spiral hollow partitions but are spaced therefrom at the sides and also at the ends of said hollow partitions.

14. A rotating combustion chamber of oblate spheroid cross section and having hollow spiral partitions each extending approximately to the middle section of said chamber, an enclosing jacket having a peripheral partition and having spiral internal flanges extending into said hollow partitions but spaced and free therefrom, means to supply combustion liquids to the jacket spaces near the axis of said chamber, and means to admit sprays of said liquids to said chamber near the periphery thereof.

15. The combination in a rotating combustion chamber as set forth in claim 14, in which the spiral partitions are double pitch and out of axial alignment and provide a tortuous inward flow of said liquids and the vapors thereof.

ESTHER C. GODDARD,
*Executrix of the Last Will and Testament of Robert H. Goddard, Deceased.*

REFERENCES CITED

The following references are of record in the file of this patent:

UNITED STATES PATENTS

| Number | Name | Date |
| --- | --- | --- |
| 985,793 | Fabel | Mar. 7, 1911 |
| 2,360,130 | Heppner | Oct. 10, 1944 |